March 7, 1967 — W. E. GRITT — 3,307,416

POWER-TRANSMISSION CHAIN

Filed Oct. 22, 1964

Witness:
Peter Andrews

Inventor:
William E. Gritt
By: Walter L. Schlegel
Atty.

United States Patent Office 3,307,416
Patented Mar. 7, 1967

3,307,416
POWER-TRANSMISSION CHAIN
William E. Gritt, Indianapolis, Ind., assignor to Amsted Industries Incorporated, Chicago, Ill., a corporation of New Jersey
Filed Oct. 22, 1964, Ser. No. 405,781
10 Claims. (Cl. 74—249)

This invention relates to power-transmission chains and, more particularly, to drive chains of the detachable type.

Detachable-type drive chains of various designs are known in the art. In general, detachable chains are comprised of links which are generally rectangular in configuration and have a centrally-positioned, generally rectangular opening between two side bars for ready association with the teeth of a sprocket. These links are of a "hook and bar" link pivot construction, where each link is formed at opposite ends thereof with an arcuate hook and a bar as direct extensions of the side bars. Each hook has a longitudinal opening to permit the coupling of the bar end of the interconnected link.

The mechanical endurance life under stress, and hence the allowable working load and speed, of conventional drive chains of the detachable type is limited by inherent design and performance limitations. Accordingly, detachable chains have been replaced in the broad range of industrial chain drive requirements by the more highly developed and higher capacity, but more costly, types of chain construction, such as the roller and inverted-tooth pivoted link chains. In spite of the aforementioned disadvantages, detachable chains are still used for farm implement and light conveyor drives in view of advantages such as simplicity and economy of design, ready detachability at each link, and the like.

One of the performance-limiting characteristics of power-transmission chains is tension caused by the dynamic effects of chordal action. As it is well known in the art, the links of a drive chain of conventional design engage a sprocket somewhat before, rather than at, the point of tangency, after which the links are carried slightly upward and over the top of the sprocket before they are carried down and around the sprocket. This chordal action transmits to the free chain an up and down motion which sets up severe stresses in the chain to reduce the effective transmissibility of the power in the chain and thereby requires compensating strength to be incorporated in the chain design.

This invention is based on a detachable-type power-transmission chain of an improved design. Briefly, the drive chain of this invention is comprised of interconnected links fabricated of flat sheet material, such as metal, with two spaced side bars supporting at opposite ends thereof a spiral-like member and an arcuate hook. Adjacent links of the chain are interconnected by means of the spiral-like members and arcuate hooks thereof engaging one another so as to form chain joints with dual contact areas. The spiral-like members and arcuate hooks are shaped such that the contacts therebetween change as the chain flexes to shorten the effective chain pitch as the angle of articulation increases, thereby decreasing the chordal action of the chain. The moving contacts between interconnected links also lessen the possibility of galling under conditions of high speed or poor lubrication, and improve movement of lubricant into the contact areas. Other advantages which are inherent in the design of this invention are easy detachment of the interconnected links, greater strength than conventional chains fabricated of the same sheet stock, and freedom from stiffness due to corrosion and dirt.

It is, therefore, a primary object of this invention to provide detachable-type drive chain links formed with a spiral-like member and an arcuate hook at opposite ends of a pair of spaced side bars.

Another object of this invention is to provide a detachable-type power-transmission chain which has greater strength than detachable chains of the prior art.

Still another object of this invention is to provide a power-transmission chain which is designed so that the pitch is shortened as the angle of articulation increases to decrease the chordal action.

A further object of this invention is to provide a power-transmission chain which features dual moving contact areas between interconnected links as they are articulated.

These and further objects of this invention will become apparent or be described as the description thereof herein proceeds and reference is made to the accompanying drawings in which.

Figure 1:
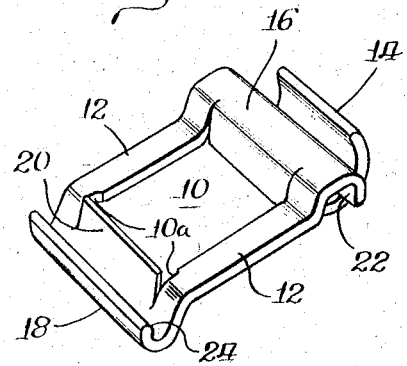
FIGURE 1 is an isometric view of a chain link of this invention.
Figure 2:
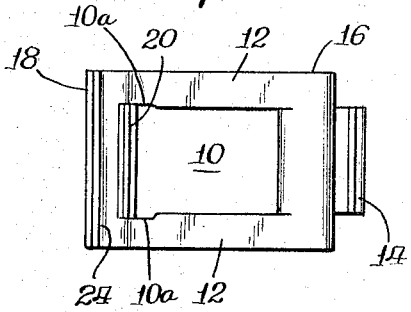
FIGURE 2 is a plan view of the chain link illustrated in FIGURE 1.
Figure 3:
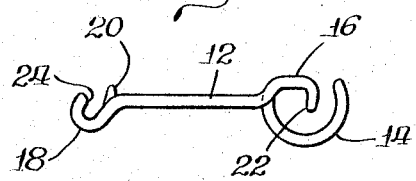
FIGURE 3 is a side elevational view of the chain link illustrated in FIGURE 1.
Figure 4:
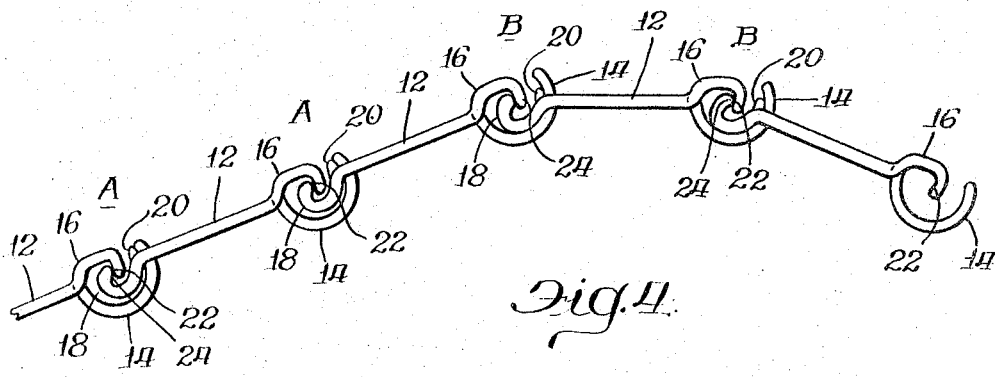
FIGURE 4 is a fragmentary side elevational view of a power-transmission chain of this invention.

This invention is best described by reference to the accompanying drawings wherein like numerals of reference are utilized to designate corresponding components in each of the several figures of drawing. Referring more particularly to FIGURES 1 to 3 which illustrate a link member of this invention, flat sheet material, e.g., metal of a suitable gauge, is stamped to provide central aperture 10 between longitudinal side bars 12. At one end of the link there are provided transverse hooks 14 and 16 which adjoin one another so as to form a spiral-like member having a smooth, continuous, inner surface. Hook 14 is arcuately formed of the metal struck from between side bars 12, while hook 16 is formed as an integral, direct extension of side bars 12 and the material defining one end of the link. Hook 16 may be either an arcuate member or quasi-arcuate member, as illustrated. Hook 14 is larger than hook 16 so that the free longitudinal end portion of hook 14 is beyond and spaced from the free longitudinal end portion of hook 16. The other end of the link is provided with transverse arcuate hook 18, which is formed oppositely of hook 16 as an integral, direct extension of side bars 12 and the material forming the opposite end of the link. Hook 18 includes portion 20 formed from metal struck from between side bars 12 and extending a short distance beyond aperture 10. Portion 20 of each link engages hook 16 of the adjacent link to prevent interconnected links from uncoupling when they are flexed in a direction opposite that in which they are flexed when engaged with a sprocket, as shown in FIGURE 4.

In general, the free ends of each of hooks 14, 16 and 18 are substantially aligned with the flat part of the link constituted of aperture 10 and side bars 12, viz., each of hooks 14, 16 and 18 are substantially entirely on one side of the link but the free ends thereof extend a relatively short distance to the other side of the link. Therefore, there is an overlapping of the spaced, free ends of hooks 14 and 16. Preferably, hook 14 is of uniform curvature, and hook 16 is formed at the unsupported longitudinal end thereof with flat inner surface 22 which is substantially normal to side bars 12. Surface 22 passes substantially through the center of curvature of hook 14, and is preferably off center in the direction of the pitch from the center of curvature. Hook 18, which has a smaller curvature than hook 16, is formed along the unsupported longitudinal edge thereof with inner bulbous projection 24 and in the area of portion 20 with a curvature corresponding to the curvature of hook 14.

The action between interconnected links as they are articulated is best described by reference to FIGURE 4 which is a fragmentary side elevational view of a chain comprised of the links hereinbefore described. In referring to FIGURE 4, it will be noted that the links connected at positions A are not flexed while the links connected at positions B are flexed as they would be at full engagement with a sprocket. The sprocket with which the chain is used is of conventional design and, accordingly, is omitted from FIGURE 4 for the purpose of simplicity, and hence clarity.

It can be seen at position A that hook 18 is shaped such that when interconnected links are unflexed, portion 20 and projection 24 of hook 18 of one link bear against the unsupported end of hook 14 and surface 22, respectively, of the connected link. It is preferred that this contact between interconnected links takes place substantially in the plane passing through the side bars of the links, although it may be offset from the plane. Inasmuch as hook 14 extends through aperture 10 behind hook 18, the width of aperture 10 adjacent to hook 18 may be increased as at 10a to avoid any possibility of hook 14 of one hook binding against side bars 12 of the adjacent hook when the two hooks are flexed, as illustrated.

As the interconnected links are engaged by a sprocket so that the joint is flexed until the links are fully engaged by the sprocket and they are at a maximum angle with respect to each other (as shown at positions B), projection 24 rocks or pivots on surface 22 to move the contact point therebetween upward. At the same time, the shape of hook 18 is such that the resultant angled downthrust from the articulation of the joined links under tension causes the bottom of hook 18 to move toward and contact the sprocket-contacting hook 14. Both of these effects are balanced by proper design proportioning to give constant bearing contact between hooks 14 and 18 with a minimum of sliding of projection 24 on surface 22. The contact areas of hook 14 and hook 18 constantly move during articulation so that both parts have a continually moving bearing contact surface. This reduces rubbing velocity and lowers the bearing contact temperature, thereby lessening the possibility of galling under conditions of high speed and/or poor lubrication, and improves movement of lubricant into the bearing contact area. The tendency to gall is also reduced because most of the load is carried by the pivoting of projection 24 on surface 22 and principally the angular downward vector of the transmitted force loads the sliding bearing between hooks 14 and 18. The pivoting of projection 24 of hook 18 on surface 22 has the further effect of shortening the pitch during articulation to decrease the chordal action of the chain. This pitch-shortening effect increases as the angle of articulation increases. This feature is particularly desirable as the chordal action of conventional detachable chains increases as the articulation angle increases.

Another major advantage of the chain of this invention over standard steel detachable chains is strength. With the same material thickness, the interlocking arrangement provides a chain which is about three times as strong as a detachable chain of conventional design. In practice, however, a thinner flat stock may be used with 180% to 200% improvement in strength.

I claim:

1. A chain link member fabricated from flat sheet material comprising two spaced side bars, a pair of transverse hooks and a third transverse hook extending from said side bars at opposite ends thereof, said pair of hooks bending from opposite faces of said side bars and having spaced, adjacent, longitudinal ends, the first hook of said pair and said third hook curving from the same face of said bars, each of said hooks having a free end thereof substantially aligned with said side bars and the first hook of said pair being larger than the second hook of said pair.

2. A chain link member fabricated from flat sheet material comprising two spaced side bars, a pair of transverse hooks and an arcuate third transverse hook extending from said side bars at opposite ends thereof, said pair of hooks bending from opposite faces of said side bars and having spaced, adjacent, longitudinal ends, the first hook of said pair and said third hook being formed in opposite directions as direct extensions of said side bars and substantially lying on opposite sides of said sheet material, each of said hooks having a free end thereof substantially aligned with said side bars, and the second hook of said pair being arcuately struck of sheet material from between said side bars and larger than said first hook.

3. A chain link member fabricated from flat sheet material comprising two spaced side bars supporting first and second hooks at one end and a third hook at the other end, said first and third hooks being oppositely formed direct extensions of said side bars and as wide as the distance between the lateral edges of said side bars, said first hook extending upwardly, thence forwardly and downwardly, said second hook being struck from material of the strip between said side bars and extending downwardly, thence forwardly and upwardly beyond and spaced from the downwardly-extending portion of said first hook, said first and second hooks adjoining one another where they are supported by said side bars so as to form a smooth, continuous surface, each of said hooks having a free end thereof substantially aligned with said side bars and said third hook being smaller than said first hook and including a section extending upwardly between and beyond said side bars.

4. A chain link member fabricated from flat sheet material comprising two spaced side bars supporting first and second hooks at one end and an arcuate third hook at the other end, the size of said first hook being intermediate that of said second and third hooks with said third hook being the smallest, said first and second hooks adjoining one another so as to form a spiral-like member having spaced, overlapping longitudinal ends and an arcuate portion formed by said second hook, said first and third hooks being formed in opposite directions and substantially lying on opposite sides of the link, all of said hooks having the free ends thereof substantially aligned with the space between said side bars.

5. A chain link member fabricated from flat sheet material comprising two spaced longitudinal side bars supporting at opposite ends thereof an arcuate hook and a spiral-like member including a first section and an arcuate second section struck from material between said side bars, said hook and first section being formed in opposite directions as direct extensions of said side bars and substantially lying on opposite sides of the link, said first section being bent to a greater degree than said hook, the free ends of said hook and first and second sections being longitudinally spaced from and substantially aligned witht the space between said side bars, the free end of said second section being further characterized as overlapping and spaced from the free end of said first section.

6. A drive chain comprising a plurality of link members arranged end-to-end with interconnected end portions, each of said links being fabricated of flat sheet material with two spaced side bars supporting at opposite ends thereof an arcuate hook and a spiral-like member including a first section and an arcuate second section struck from material between said side bars leaving an aperture between said side bars, said hook and first section being formed in opposite directions as direct extensions of said side bars and substantially lying on opposite sides of the link, said hook and said first and second sections being provided with free ends thereof, the links being interconnected by inner portions of said hooks and first sections of interconnected links pivotally bearing against one another near the free longitudinal ends thereof with said second sections passing through the apertures between said side bars of interconnected links and engaging outer portions of said hooks.

7. A drive chain in accordance wtih claim 6 in which the free ends of said first sections bearing against said hooks are flat surfaces substantially normal to the side bars of the respective links.

8. A drive chain in accordance with claim 7 in which said hooks are formed along the free longitudinal ends thereof with inner bulbous projections bearing against said flat surfaces.

9. A drive chain in accordance with claim 8 in which said hooks and spiral-like members are shaped such that unflexed interconnected links contact one another substantially only at said bulbous projections and flat surfaces.

10. A drive chain in accordance with claim 9 in which said hooks and second sections of interconnected links have opposing surfaces which substantially conform in shape and slideably engage one another when interconnected links are flexed.

References Cited by the Examiner

UNITED STATES PATENTS

| | | | |
|---|---|---|---|
| 482,273 | 9/1892 | Corscaden | 74—248 |
| 853,129 | 5/1907 | Simpson | 74—249 X |
| 1,107,808 | 8/1914 | Locke | 74—248 |
| 1,699,400 | 1/1929 | Locke | 74—252 |
| 2,836,984 | 6/1958 | Bendall | 74—249 |
| 3,027,774 | 4/1962 | Bendall | 74—249 |
| 3,123,411 | 3/1964 | Ellison | 74—252 X |

FOREIGN PATENTS 351,879    7/1931    Great Britain.

DAVID J. WILLIAMOWSKY, *Primary Examiner.*

J. A. WONG, *Assistant Examiner.*